(12) United States Patent
Liu

(10) Patent No.: US 8,640,888 B2
(45) Date of Patent: Feb. 4, 2014

(54) BIKE CARRYING DEVICE

(76) Inventor: Yao-Huang Liu, Yongkang (TW)

( * ) Notice: Subject to any disclaimer, the term of this patent is extended or adjusted under 35 U.S.C. 154(b) by 321 days.

(21) Appl. No.: 13/231,076

(22) Filed: Sep. 13, 2011

(65) Prior Publication Data

US 2013/0062487 A1 Mar. 14, 2013

(51) Int. Cl.
*A47F 7/00* (2006.01)
*B60R 9/048* (2006.01)
*B60R 9/00* (2006.01)

(52) U.S. Cl.
USPC .............................. 211/17; 224/324; 224/501

(58) Field of Classification Search
USPC ......... 211/17–24; 248/125.1, 292.12, 295.11; 224/501, 533, 924, 536, 324
See application file for complete search history.

(56) References Cited

U.S. PATENT DOCUMENTS

| | | | | |
|---|---|---|---|---|
| 5,169,042 A * | 12/1992 | Ching | ............................ | 224/535 |
| 5,447,241 A * | 9/1995 | Bureau | ............................ | 211/18 |
| 5,730,343 A * | 3/1998 | Settelmayer | .................. | 224/321 |
| 6,010,048 A * | 1/2000 | Settelmayer | .................. | 224/321 |
| 6,439,397 B1 * | 8/2002 | Reeves | ............................ | 211/17 |
| 6,523,731 B1 * | 2/2003 | Pedrini | ........................... | 224/537 |
| 6,695,184 B2 * | 2/2004 | Higginbotham, III | ........ | 224/501 |
| 6,761,297 B1 * | 7/2004 | Pedrini | ........................... | 224/519 |
| 7,044,347 B1 * | 5/2006 | Pedrini | ........................... | 224/501 |
| 7,104,430 B2 * | 9/2006 | Reeves | ............................ | 224/536 |
| 7,222,763 B2 * | 5/2007 | Pedrini | ........................... | 224/519 |
| 7,240,816 B2 * | 7/2007 | Tsai | ............................... | 224/501 |
| 7,481,344 B2 * | 1/2009 | Naslund et al. | ................ | 224/319 |
| 7,556,229 B2 * | 7/2009 | Elliott et al. | ............... | 248/230.1 |
| 8,113,398 B2 * | 2/2012 | Sautter et al. | .................. | 224/497 |
| 8,136,708 B2 * | 3/2012 | Sautter et al. | .................. | 224/321 |
| 8,235,267 B2 * | 8/2012 | Sautter et al. | .................. | 224/497 |
| 2003/0164390 A1 * | 9/2003 | Higginbotham, III | ........ | 224/519 |
| 2004/0238582 A1 * | 12/2004 | Pedrini | ........................... | 224/519 |
| 2005/0061842 A1 * | 3/2005 | Tsai | ............................... | 224/501 |
| 2006/0029483 A1 * | 2/2006 | Allen et al. | ..................... | 410/30 |
| 2006/0273126 A1 * | 12/2006 | Pedrini | ........................... | 224/536 |
| 2007/0057001 A1 * | 3/2007 | Wang | .............................. | 224/536 |
| 2008/0099522 A1 * | 5/2008 | Clausen et al. | ............... | 224/519 |
| 2009/0095782 A1 * | 4/2009 | Liu | ................................ | 224/502 |
| 2009/0120984 A1 * | 5/2009 | Sautter et al. | .................. | 224/497 |
| 2009/0120985 A1 * | 5/2009 | Sautter et al. | .................. | 224/497 |
| 2011/0011909 A1 * | 1/2011 | Liu | ................................ | 224/501 |
| 2012/0125964 A1 * | 5/2012 | Sautter et al. | .................. | 224/497 |
| 2013/0022440 A1 * | 1/2013 | Sautter et al. | .................. | 414/800 |
| 2013/0062383 A1 * | 3/2013 | Jeli | ................................ | 224/497 |

* cited by examiner

*Primary Examiner* — Jonathan Liu
*Assistant Examiner* — Patrick Hawn
(74) *Attorney, Agent, or Firm* — Alan Kamrath; Kamrath IP Lawfirm, P.A.

(57) ABSTRACT

A bike carrying device includes a support post (5), a mounting unit (4) mounted on the support post, a positioning bar (6) mounted on the mounting unit, a pawl member (7) mounted in the mounting unit, a release member (415) mounted in the mounting unit, a lock mechanism (414) mounted on the mounting unit and connected with the release member, and an elastic member (8) biased between the mounting unit and the pawl member. Thus, the bike carrying device has a simplified construction to decrease the cost of fabrication.

9 Claims, 10 Drawing Sheets

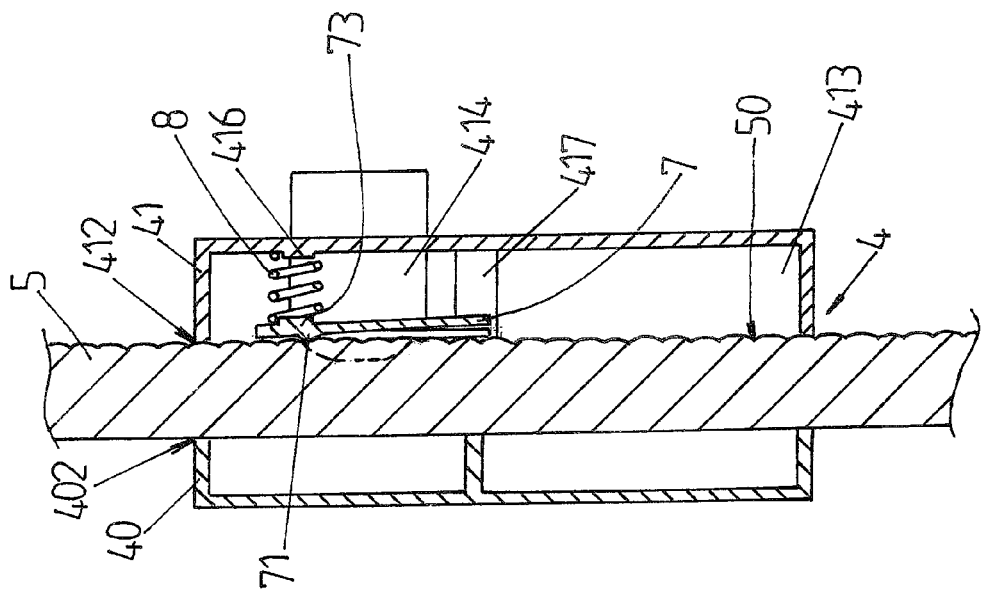
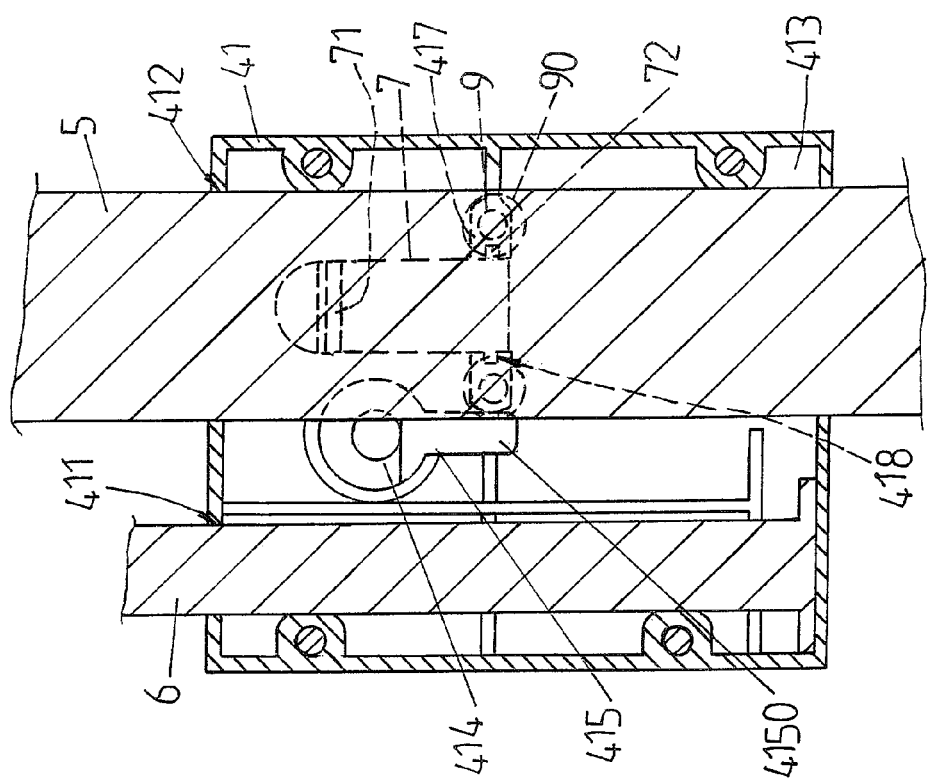

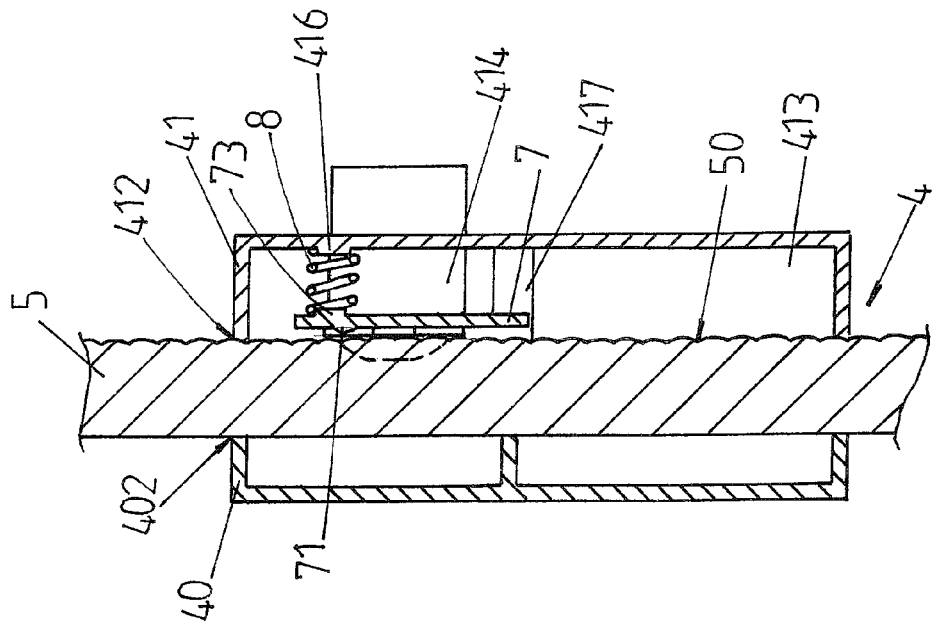
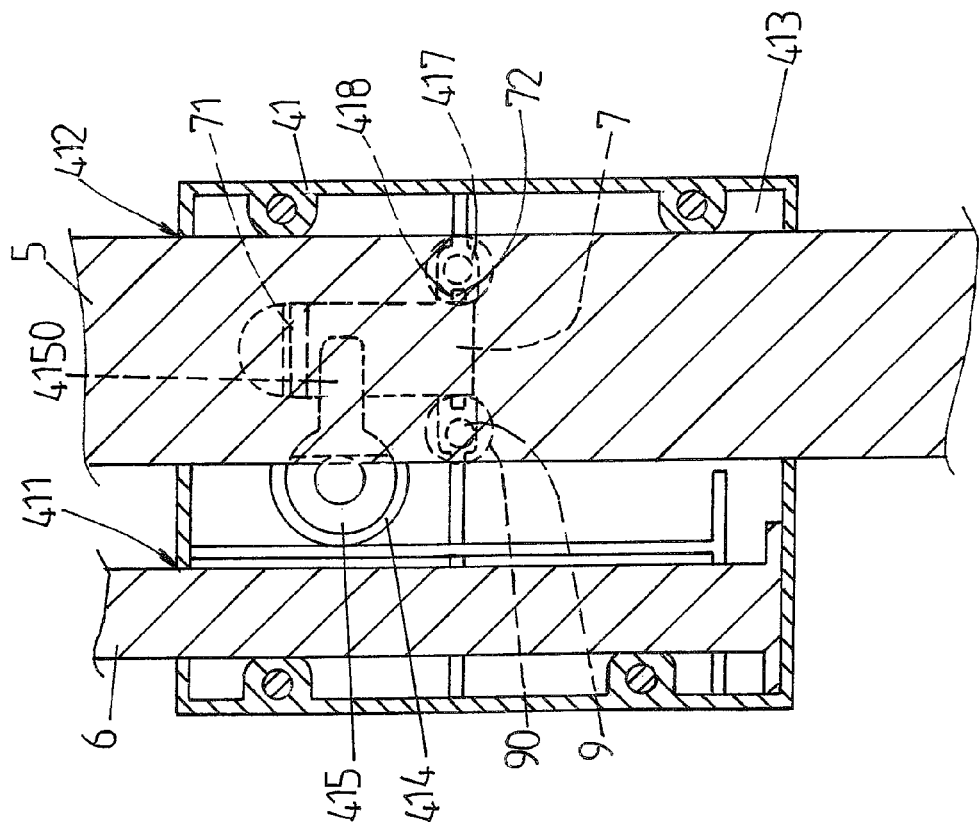

BIKE CARRYING DEVICE

BACKGROUND OF THE INVENTION

1. Field of the Invention

The present invention relates to a carrying device and, more particularly, to a bike carrying device.

2. Description of the Related Art

A conventional bike carrying device in accordance with the prior art shown in FIGS. 1-4 comprises a support unit 10 for mounting a bike, and two wheel positioning units 13 located at two opposite sides of the support unit 10 for positioning wheels of the bike.

The support unit 10 includes a support frame 101 disposed between the wheel positioning units 13, a mounting seat 2 secured on the support frame 101, two adjusting rods 110 each movably mounted on the mounting seat 2, two positioning bars 14 each connected with a respective one of the adjusting rods 110, two pawl members 12 each pivotally mounted on the mounting seat 2, two elastic members 120 each biased between the mounting seat 2 and a respective one of the pawl members 12, and a lock mechanism 3 mounted on the mounting seat 2 to limit the pawl members 12. Each of the adjusting rods 110 is received in the support frame 101. Each of the adjusting rods 110 has a side provided with a plurality of locking grooves 112 and an elongate guide channel 111 extended through the locking grooves 112. Each of the positioning bars 14 has a first end secured on the upper end of the respective adjusting rod 110 to move in concert with the respective adjusting rod 110 and has a bent second end that is hooked on a bike to position the bike. The mounting seat 2 has a mediate portion provided with two receiving holes 21 to allow passage of the adjusting rods 110. The mounting seat 2 has two opposite sides each provided with a recessed connecting portion 22 for mounting a respective one of the pawl members 12 and a respective one of the elastic members 120. The connecting portion 22 of the mounting seat 2 has two opposite sidewalls each provided with a fixing hole 23. Each of the pawl members 12 is pivotally mounted on the respective connecting portion 22 of the mounting seat 2 and has a first end provided with a press portion 123 and a second end provided with a locking portion 122 extended through a peripheral wall of the mounting seat 2 and detachably locked onto one of the locking grooves 112 of a respective one of the adjusting rods 110. The second end of each of the pawl members 12 has a side provided with a guide portion 121 on which the guide channel 111 of the respective adjusting rod 110 is slidable. Each of the elastic members 120 is received in the respective connecting portion 22 of the mounting seat 2. The lock mechanism 3 includes a limit member 30 having a first leg 301 and a second leg 302 each extended through the respective fixing hole 23 of the mounting seat 2 and each disposed between the press portion 123 of a respective one of the pawl members 12 and a respective one of the adjusting rods 110, and a locking member 31 mounted on the first leg 301 of the limit member 30. The locking member 31 is locked and unlocked by a key.

In operation, when the locking member 31 is locked, the first leg 301 of the limit member 30 is locked by the locking member 31 so that the limit member 30 is locked onto the mounting seat 2. Thus, each of the first leg 301 and the second leg 302 of the limit member 30 is disposed between the press portion 123 of the respective pawl member 12 and the respective adjusting rod 110 so that the press portion 123 of the respective pawl member 12 cannot be pushed toward the respective adjusting rod 110.

On the contrary, when the locking member 31 is unlocked, the first leg 301 of the limit member 30 is unlocked from the locking member 31 so that the limit member 30 is unlocked from the mounting seat 2. Thus, each of the first leg 301 and the second leg 302 of the limit member 30 is detached from the press portion 123 of the respective pawl member 12 and the respective adjusting rod 110 so that the press portion 123 of the respective pawl member 12 cannot be pushed toward the respective adjusting rod 110. In such a manner, when the press portion 123 of each of the pawl members 12 is pushed toward the respective adjusting rod 110, the locking portion 122 of each of the pawl members 12 is detached from one of the locking grooves 112 of the respective adjusting rod 110 so that the respective adjusting rod 110 is released from the mounting seat 2. Thus, when each of the adjusting rods 110 is unlocked from the respective pawl member 12 and is released from the mounting seat 2, each of the adjusting rods 110 is moved freely on the mounting seat 2, and each of the positioning bars 14 is moved freely to unlock the bike.

Thus, the conventional bike carrying device can be used to lock the bike on a car, thereby preventing the bike from being loosened from the car, and thereby providing an antitheft function. However, the conventional bike carrying device has a complicated construction, thereby greatly increasing the cost of fabrication.

BRIEF SUMMARY OF THE INVENTION

In accordance with the present invention, there is provided a bike carrying device, comprising a support post, a mounting unit mounted on the support post, a positioning bar mounted on the mounting unit, a pawl member mounted in the mounting unit, a release member mounted in the mounting unit, a lock mechanism mounted on the mounting unit and connected with the release member, and an elastic member biased between the mounting unit and the pawl member.

The support post has a side provided with a plurality of locking grooves. The mounting unit includes a front shell, a rear shell combined with the front shell, and two mounting bases mounted on the rear shell. Each of the mounting bases of the mounting unit has a side provided with a pivot groove. The pawl member has a lower end pivotally mounted between the mounting bases of the mounting unit and has an upper end provided with a locking hook releasably locked onto one of the locking grooves of the support post so as to lock the mounting unit onto the support post. The lower end of the pawl member has two opposite sides each provided with a pivot stub pivotally mounted in the pivot groove of a respective one of the mounting bases so that the lower end of the pawl member is pivotally mounted between the mounting bases of the mounting unit, and the pawl member is pivotable relative to the mounting bases of the mounting unit. The release member has an upper end secured on the lock mechanism to rotate in concert with the lock mechanism and has a lower end provided with a resting plate that is movable to abut the pawl member. The resting plate of the release member has a side provided with a pressing ramp that is movable to press the locking hook of the pawl member so as to move and detach the locking hook of the pawl member from one of the locking grooves of the support post and to unlock the mounting unit from the support post.

According to the primary advantage of the present invention, the bike carrying device has a simplified construction to decrease the cost of fabrication.

According to another advantage of the present invention, a user only needs to rotate the lock mechanism by a key so as to lock or unlock the mounting unit so that the user can operate the bike carrying device to lock or unlock the bike easily and quickly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 9 is a cross-sectional view of the bike carrying device taken along line 9-9 as shown in FIG. 5.

FIG. 10 is a cross-sectional view of the bike carrying device taken along line 10-10 as shown in FIG. 5.

FIG. 11 is a schematic operational view of the bike carrying device as shown in FIG. 9.

FIG. 12 is a schematic operational view of the bike carrying device as shown in FIG. 10.

DETAILED DESCRIPTION OF THE INVENTION

Figure 1:
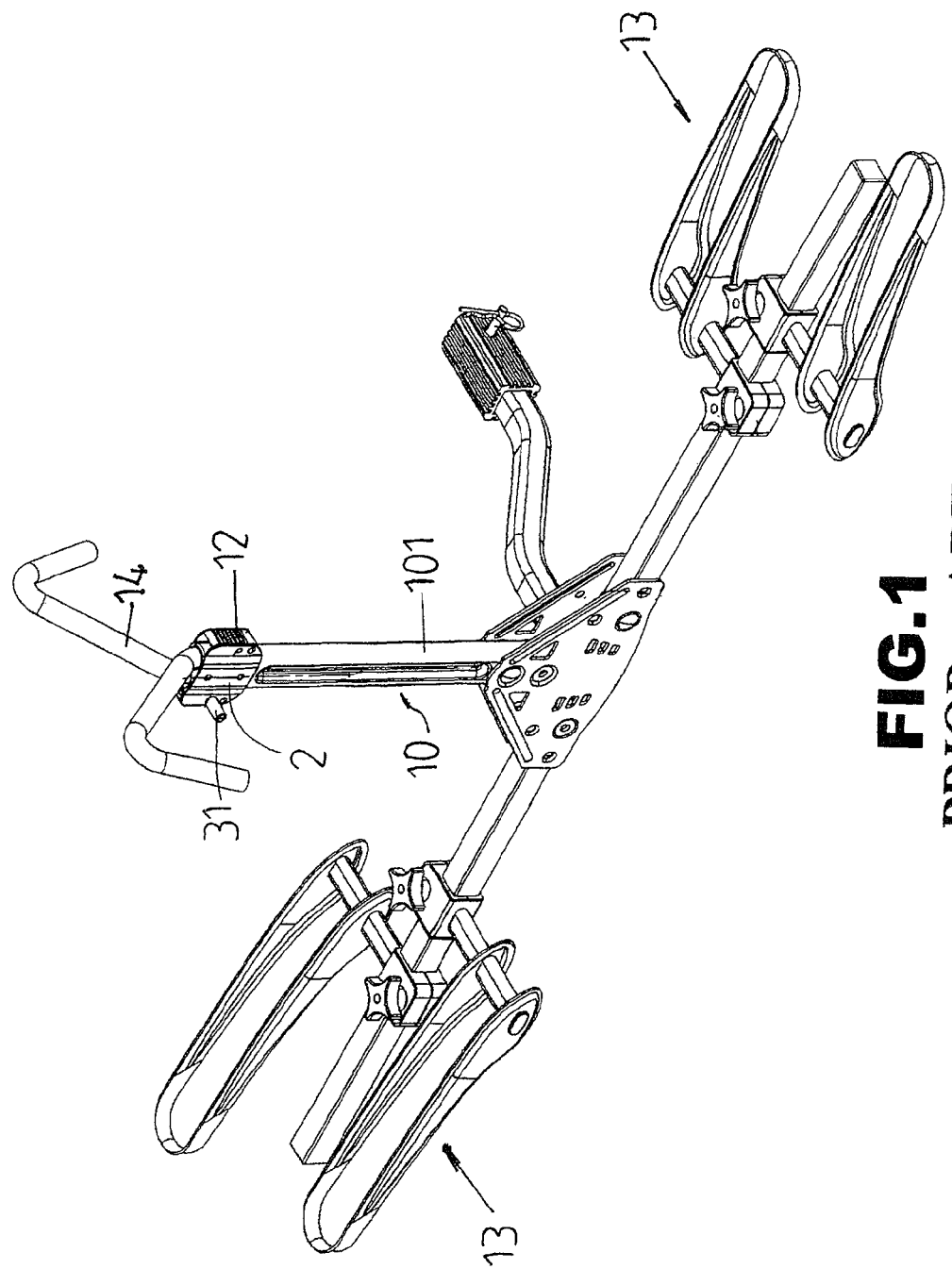
FIG. 1 is a perspective view of a conventional bike carrying device in accordance with the prior art.
Figure 2:
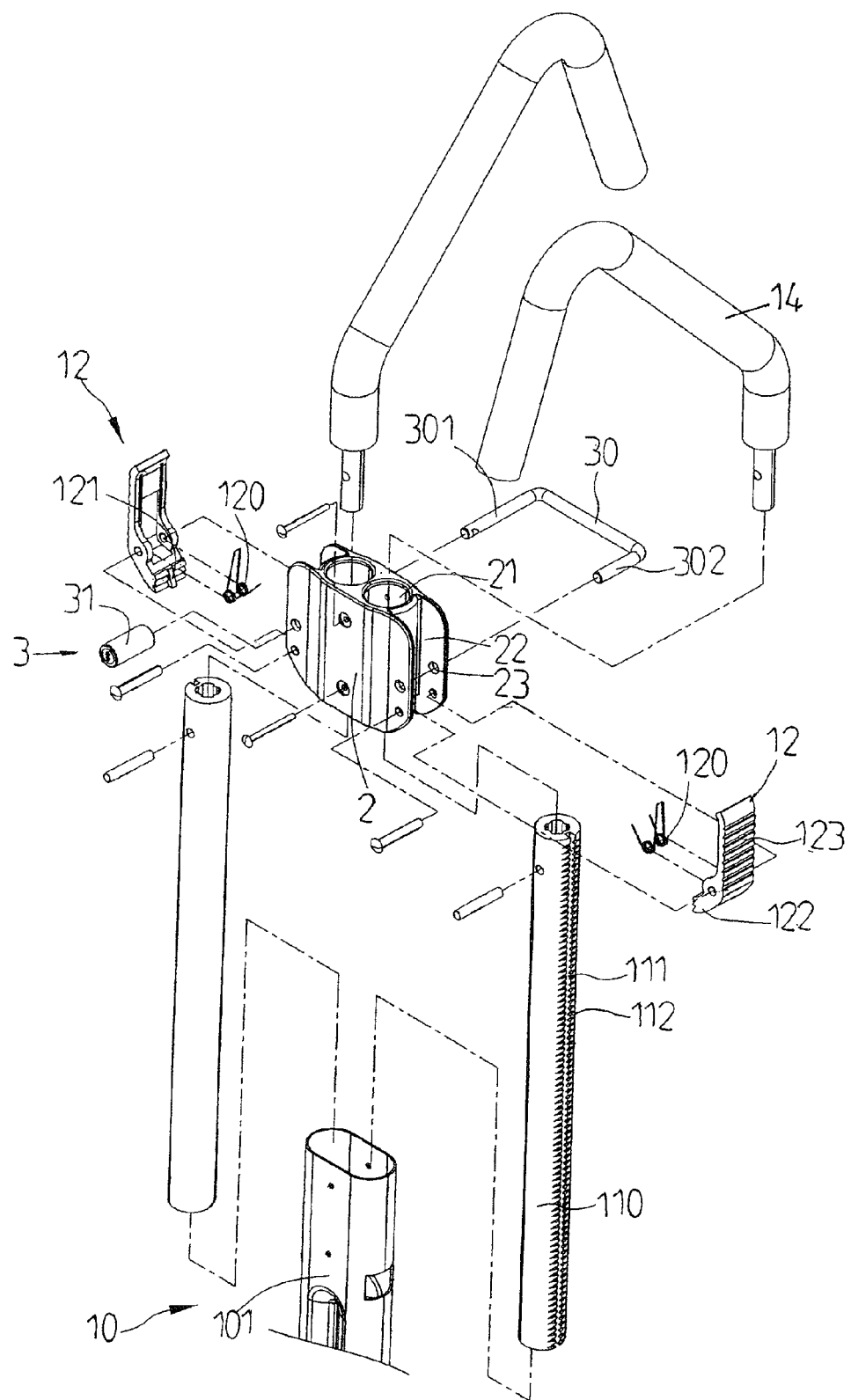
FIG. 2 is a partially exploded perspective view of the conventional bike carrying device as shown in FIG. 1.
Figure 3:
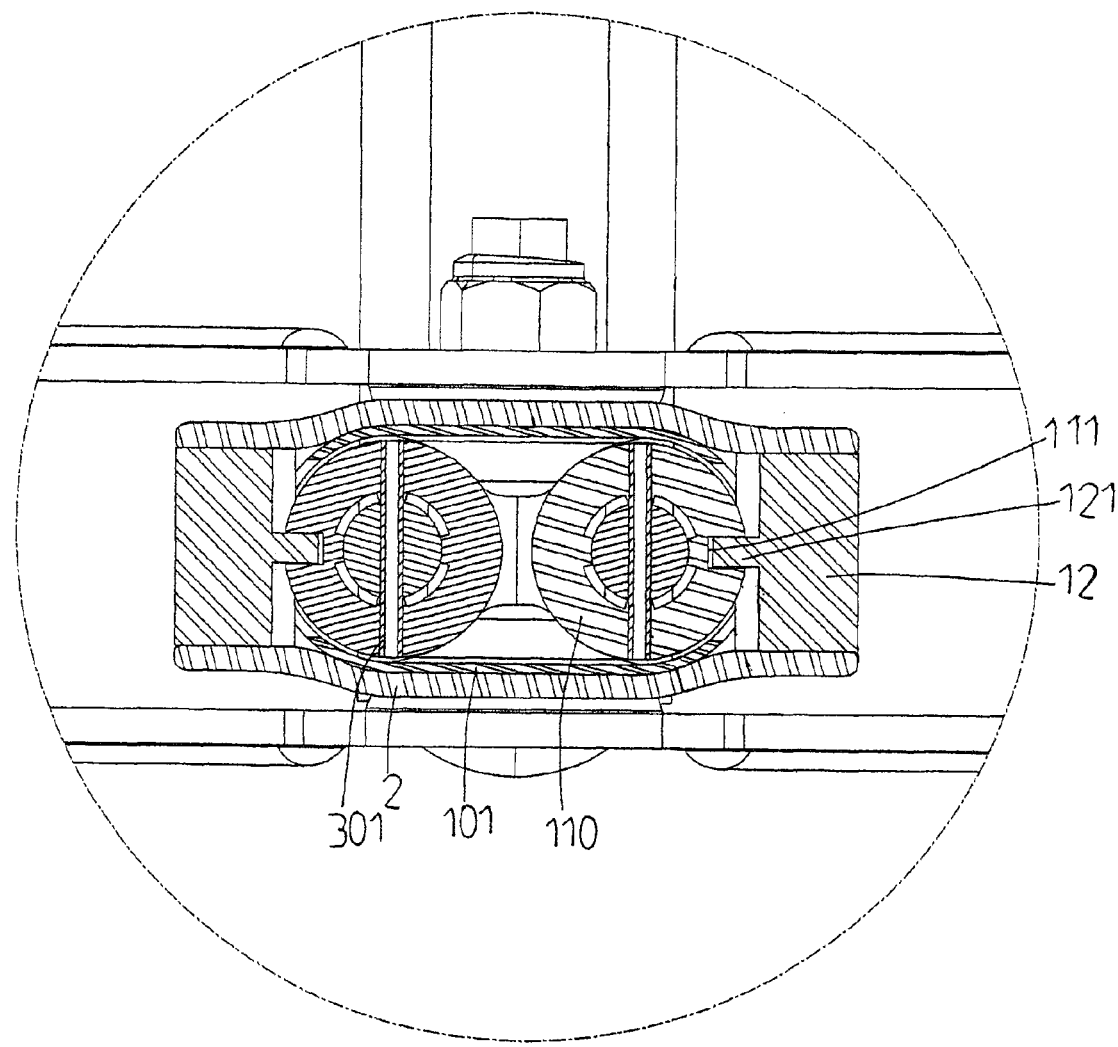
FIG. 3 is a partially cross-sectional view of the conventional bike carrying device as shown in FIG. 1.
Figure 4:
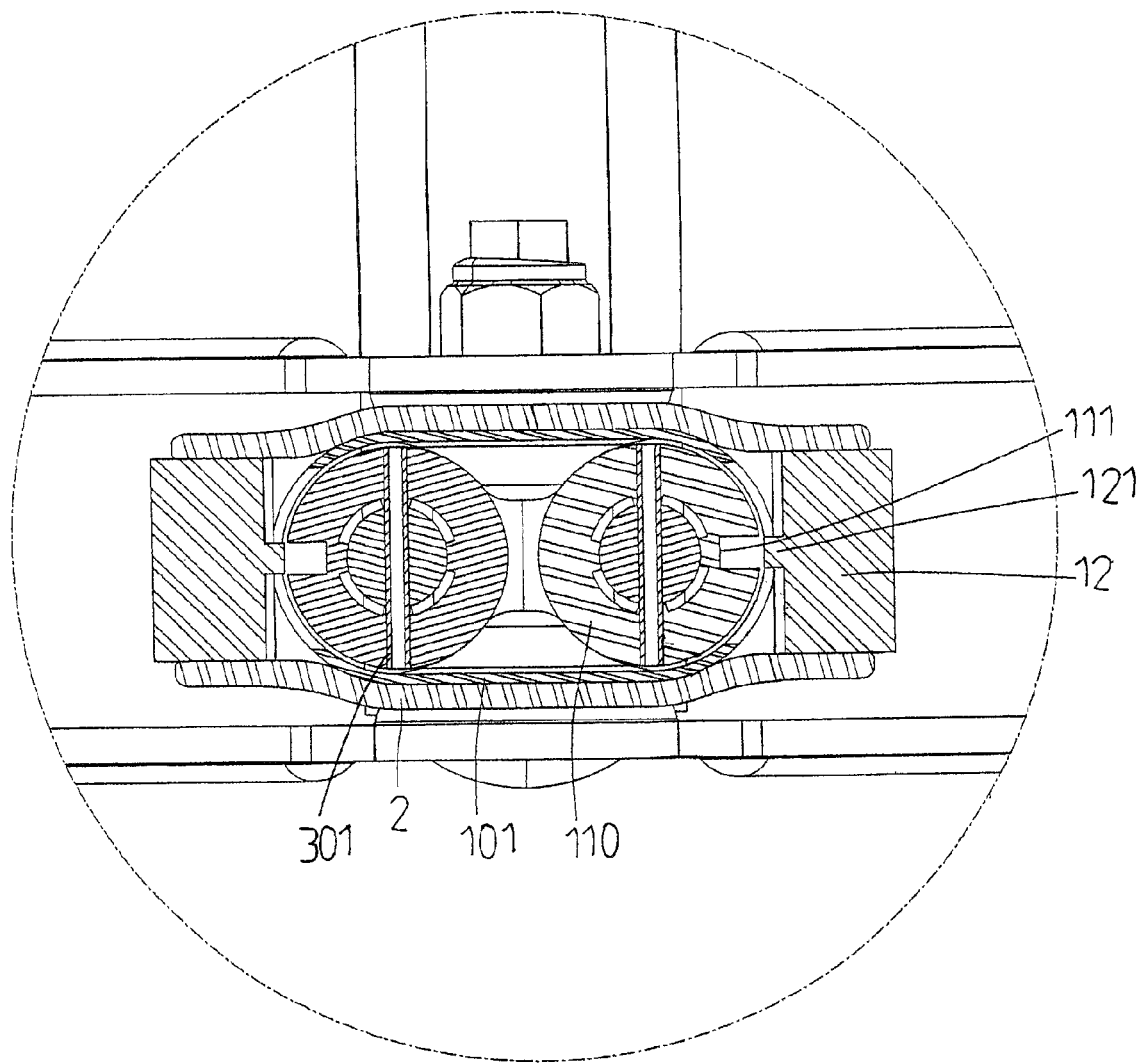
FIG. 4 is a schematic operational view of the conventional bike carrying device as shown in FIG. 3.
Figure 5:
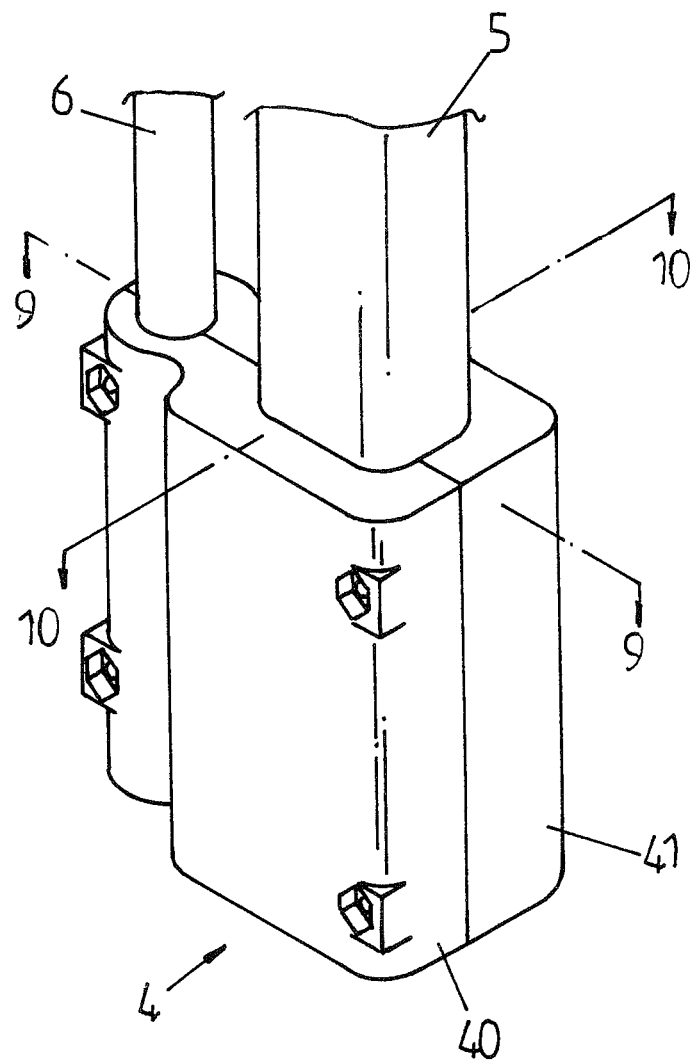
FIG. 5 is a partially perspective view of a bike carrying device in accordance with the preferred embodiment of the present invention.
Figure 6:
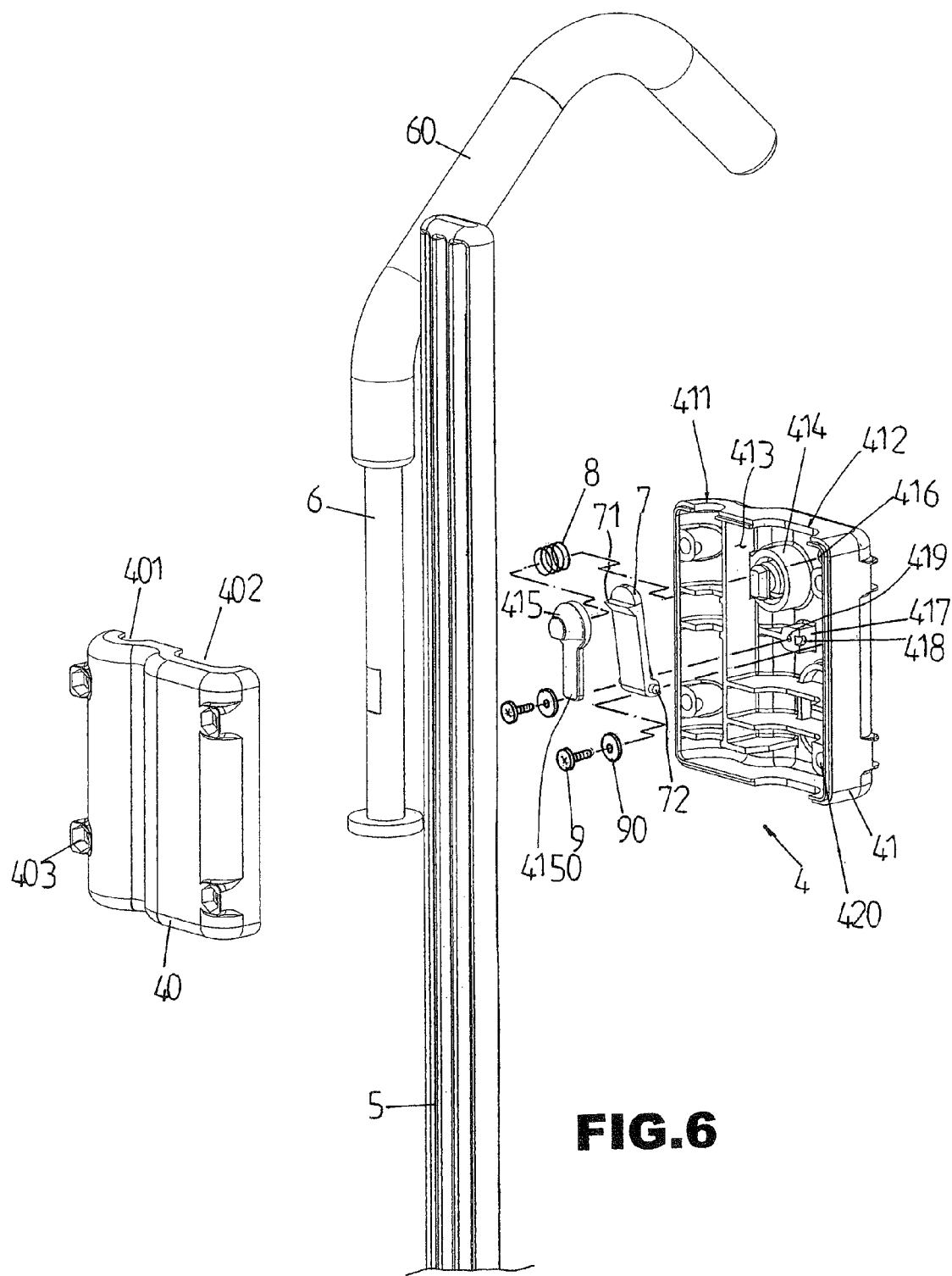
FIG. 6 is an exploded perspective assembly view of the bike carrying device as shown in FIG. 5.
Figure 7:
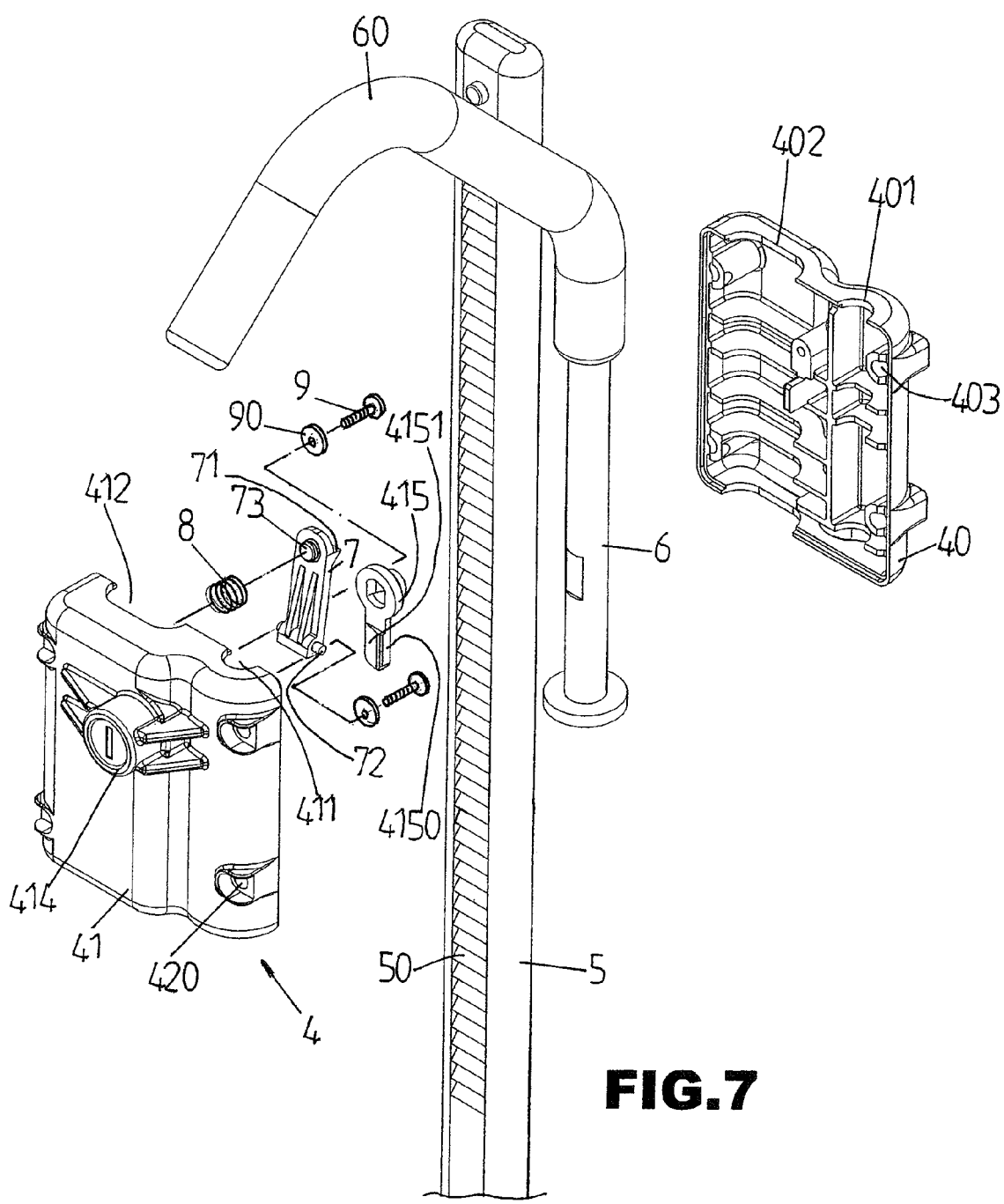
FIG. 7 is another exploded perspective assembly view of the bike carrying device as shown in FIG. 5.
Figure 8:
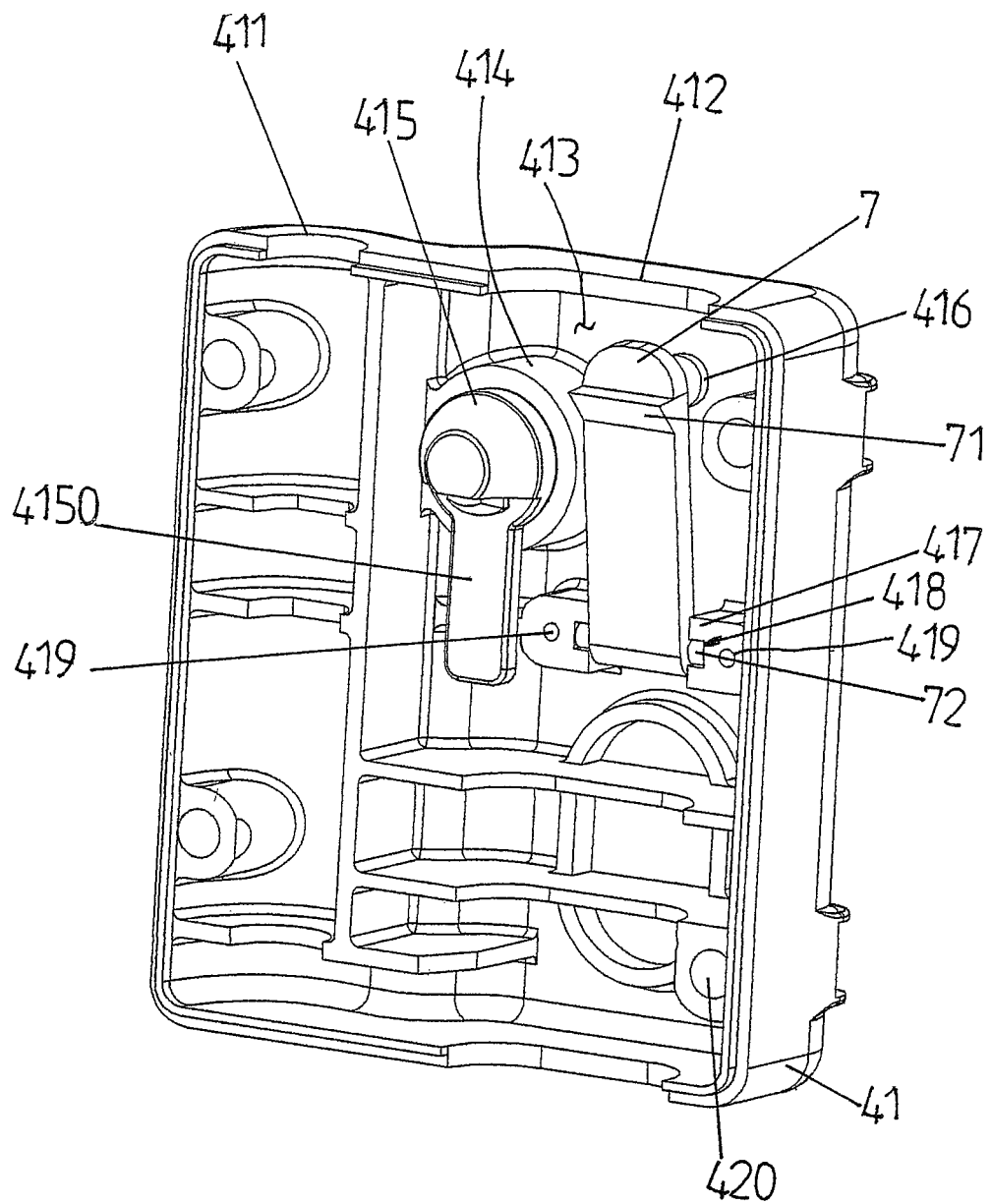
FIG. 8 is a partially perspective assembly view of the bike carrying device as shown in FIG. 6.

Referring to the drawings and initially to FIGS. 5-10, a bike carrying device in accordance with the preferred embodiment of the present invention comprises a support post 5, a mounting unit 4 mounted on the support post 5, a positioning bar 6 mounted on the mounting unit 4, a pawl member 7 mounted in the mounting unit 4, a release member 415 mounted in the mounting unit 4, a lock mechanism 414 mounted on the mounting unit 4 and connected with the release member 415, and an elastic member 8 biased between the mounting unit 4 and the pawl member 7.

The support post 5 has a side provided with a plurality of locking grooves 50. The positioning bar 6 has a bent upper end 60 that is hooked on a bike to position the bike.

The mounting unit 4 includes a front shell 40, a rear shell 41 combined with the front shell 40, two mounting bases 417 mounted on the rear shell 41, and a retaining flange 416 mounted on the rear shell 41 for mounting the elastic member 8.

The front shell 40 of the mounting unit 4 has a side provided with a first opening 401 to allow passage of the positioning bar 6, and provided with a first slot 402 to allow passage of the support post 5. The front shell 40 of the mounting unit 4 has four corners each provided with a first fixing hole 403.

The rear shell 41 of the mounting unit 4 has a side provided with a second opening 411 juxtaposed to the first opening 401 to allow passage of the positioning bar 6, and provided with a second slot 412 juxtaposed to the first slot 402 to allow passage of the support post 5. The rear shell 41 of the mounting unit 4 has an interior provided with a receiving space 413 to receive the lock mechanism 414, the release member 415 and the pawl member 7. The rear shell 41 of the mounting unit 4 has four corners each provided with a second fixing hole 420 aligning with the respective first fixing hole 403 of the front shell 40 so that the rear shell 41 is combined with the front shell 40 by the first fixing holes 403 and the second fixing holes 420.

Each of the mounting bases 417 of the mounting unit 4 has a side provided with a pivot groove 418 and has a surface provided with a screw bore 419.

The pawl member 7 has a lower end pivotally mounted between the mounting bases 417 of the mounting unit 4 and has an upper end provided with a locking hook 71 releasably locked onto one of the locking grooves 50 of the support post 5 so as to lock the mounting unit 4 onto the support post 5. The lower end of the pawl member 7 has two opposite sides each provided with a pivot stub 72 pivotally mounted in the pivot groove 418 of a respective one of the mounting bases 417 so that the lower end of the pawl member 7 is pivotally mounted between the mounting bases 417 of the mounting unit 4, and the pawl member 7 is pivotable relative to the mounting bases 417 of the mounting unit 4. The upper end of the pawl member 7 has a surface provided with a retaining lug 73 for mounting the elastic member 8. The retaining lug 73 and the locking hook 71 are located at two opposite sides of the pawl member 7. The locking hook 71 of the pawl member 7 is pushed toward one of the locking grooves 50 of the support post 5 by an elastic force of the elastic member 8.

The bike carrying device further comprises two washers 90 each mounted on a respective one of the mounting bases 417 and each abutting the respective pivot stub 72 of the pawl member 7 to limit the respective pivot stub 72 of the pawl member 7 in the pivot groove 418 of the respective mounting base 417 and to limit the pawl member 7 between the mounting bases 417 of the mounting unit 4, and two fastening screws 9 each extended through a respective one of the washers 90 and each screwed into the screw bore 419 of a respective one of the mounting bases 417 to affix the washers 90 to the mounting bases 417 of the mounting unit 4 respectively.

The lock mechanism 414 is extended through the rear shell 41 of the mounting unit 4 and is rotatably mounted in the receiving space 413 of the rear shell 41. The lock mechanism 414 is rotated by a key.

The release member 415 has an upper end secured on the lock mechanism 414 to rotate in concert with the lock mechanism 414 and has a lower end provided with a resting plate 4150 that is movable to abut the pawl member 7. The resting plate 4150 of the release member 415 has a side provided with a pressing ramp 4151 that is movable to press the locking hook 71 of the pawl member 7 so as to move and detach the locking hook 71 of the pawl member 7 from one of the locking grooves 50 of the support post 5 and to unlock the mounting unit 4 from the support post 5.

The elastic member 8 has a first end secured on the retaining flange 416 of the mounting unit 4 and a second end secured on the retaining lug 73 of the pawl member 7.

In operation, referring to FIGS. 9-12 with reference to FIGS. 5-8, the mounting unit 4 is moved downward on the support post 5 until the upper end 60 of the positioning bar 6 is hooked on the bike so that the bike is positioned by the positioning bar 6. At this time, the locking hook 71 of the pawl member 7 is pushed toward one of the locking grooves 50 of the support post 5 by the elastic force of the elastic member 8 so that the locking hook 71 of the pawl member 7 is locked onto one of the locking grooves 50 of the support post 5 as shown in FIG. 10 to lock the mounting unit 4 onto the support post 5 and to lock the positioning bar 6 onto the bike so as to lock the bike on a car solidly and stably, thereby preventing the bike from being loosened from the car, and thereby providing an antitheft function.

On the contrary, when the lock mechanism 414 is rotated by a key, the release member 415 is driven and pivoted by the lock mechanism 414 so that the resting plate 4150 of the release member 415 is moved from the position as shown in FIG. 9 to the position as shown in FIG. 11 so as to abut the pawl member 7, and the pressing ramp 4151 of the release member 415 is further moved to press the locking hook 71 of the pawl member 7 so as to move and detach the locking hook 71 of the pawl member 7 from one of the locking grooves 50 of the support post 5 as shown in FIG. 12 and to unlock the mounting unit 4 from the support post 5. In such a manner, the mounting unit 4 is unlocked from the support post 5 so that the mounting unit 4 is moved on the support post 5 freely to detach the positioning bar 6 from the bike so as to unlock the bike.

Accordingly, the bike carrying device has a simplified construction to decrease the cost of fabrication. In addition, a user only needs to rotate the lock mechanism 414 by a key so as to lock or unlock the mounting unit 4 so that the user can operate the bike carrying device to lock or unlock the bike easily and quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A bike carrying device, comprising:
   a support post;
   a mounting unit mounted on the support post;
   a positioning bar mounted on the mounting unit;
   a pawl member mounted in the mounting unit;
   a release member mounted in the mounting unit;
   a lock mechanism mounted on the mounting unit and connected with the release member; and
   an elastic member biased between the mounting unit and the pawl member;
   wherein:
   the support post has a side provided with a plurality of locking grooves;
   the mounting unit includes:
   a front shell;
   a rear shell combined with the front shell; and
   two mounting bases mounted on the rear shell;
   each of the mounting bases of the mounting unit has a side provided with a pivot groove;
   the pawl member has a lower end pivotally mounted between the mounting bases of the mounting unit and has an upper end provided with a locking hook releasably locked onto one of the locking grooves of the support post so as to lock the mounting unit onto the support post;
   the lower end of the pawl member has two opposite sides each provided with a pivot stub pivotally mounted in the pivot groove of a respective one of the mounting bases so that the lower end of the pawl member is pivotally mounted between the mounting bases of the mounting unit, and the pawl member is pivotable relative to the mounting bases of the mounting unit;
   the release member has an upper end secured on the lock mechanism to rotate in concert with the lock mechanism and has a lower end provided with a resting plate that is movable to abut the pawl member;
   the resting plate of the release member has a side provided with a pressing ramp that is movable to press the locking hook of the pawl member so as to move and detach the locking hook of the pawl member from one of the locking grooves of the support post and to unlock the mounting unit from the support post; and
   the resting plate is arranged between the pawl member and the support post.

2. The bike carrying device of claim 1, wherein the rear shell of the mounting unit has an interior provided with a receiving space to receive the lock mechanism, the release member and the pawl member.

3. The bike carrying device of claim 1, wherein
   the mounting unit further includes a retaining flange mounted on the rear shell for mounting the elastic member;
   the upper end of the pawl member has a surface provided with a retaining lug for mounting the elastic member;
   the elastic member has a first end secured on the retaining flange of the mounting unit and a second end secured on the retaining lug of the pawl member.

4. The bike carrying device of claim 3, wherein the retaining lug and the locking hook are located at two opposite sides of the pawl member.

5. The bike carrying device of claim 4, wherein the locking hook of the pawl member is pushed toward one of the locking grooves of the support post by an elastic force of the elastic member.

6. The bike carrying device of claim 1, wherein
   each of the mounting bases of the mounting unit has a surface provided with a screw bore;
   the bike carrying device further comprises:
   two washers each mounted on a respective one of the mounting bases and each abutting the respective pivot stub of the pawl member to limit the respective pivot stub of the pawl member in the pivot groove of the respective mounting base and to limit the pawl member between the mounting bases of the mounting unit; and
   two fastening screws each extended through a respective one of the washers and each screwed into the screw bore of a respective one of the mounting bases to affix the washers to the mounting bases of the mounting unit respectively.

7. The bike carrying device of claim 1, wherein
   the front shell of the mounting unit has a side provided with a first opening to allow passage of the positioning bar, and provided with a first slot to allow passage of the support post;
   the rear shell of the mounting unit has a side provided with a second opening juxtaposed to the first opening to allow passage of the positioning bar, and provided with a second slot juxtaposed to the first slot to allow passage of the support post.

8. The bike carrying device of claim 1, wherein the lock mechanism is extended through the rear shell of the mounting unit.

9. The bike carrying device of claim 2, wherein the lock mechanism is rotatably mounted in the receiving space of the rear shell.

* * * * *